United States Patent
Hytonen et al.

(10) Patent No.: US 12,491,378 B2
(45) Date of Patent: Dec. 9, 2025

(54) SYSTEMS AND METHODS FOR PLACEMENT OF ENERGY LAYERS AND SPOTS OF PROTON BEAMS IN TARGET REGIONS

(71) Applicant: Siemens Healthineers International AG, Steinhausen (CH)

(72) Inventors: Roni Hytonen, Espoo (FI); Pierre Lansonneur, Lyons (FR)

(73) Assignee: Siemens Healthineers International AG, Steinhausen (CH)

( * ) Notice: Subject to any disclaimer, the term of this patent is extended or adjusted under 35 U.S.C. 154(b) by 208 days.

(21) Appl. No.: 18/238,969

(22) Filed: Aug. 28, 2023

(65) Prior Publication Data

US 2025/0073495 A1     Mar. 6, 2025

(51) Int. Cl.
    *A61N 5/10*      (2006.01)

(52) U.S. Cl.
    CPC .......... *A61N 5/1031* (2013.01); *A61N 5/103* (2013.01); *A61N 5/1043* (2013.01); *A61N 5/1048* (2013.01); *A61N 2005/1074* (2013.01); *A61N 2005/1087* (2013.01)

(58) Field of Classification Search
    CPC ........ A61N 5/10; A61N 5/103; A61N 5/1031; A61N 5/1042; A61N 5/1043; A61N 5/1044; A61N 5/1045; A61N 5/1047; A61N 5/1048; A61N 5/1049; A61N 5/1064; A61N 5/1065; A61N 5/1067; A61N 5/1071; A61N 2005/1072; A61N 2005/1074; A61N 2005/1087
    USPC ................. 250/396 R, 396 ML, 400; 378/65
See application file for complete search history.

(56) References Cited

U.S. PATENT DOCUMENTS

| | | | | |
|---|---|---|---|---|
| 7,550,752 B2 * | 6/2009 | Keppel | ................ | A61N 5/1031 250/494.1 |
| 7,560,715 B2 * | 7/2009 | Pedroni | ................ | A61N 5/1043 315/501 |
| 8,644,571 B1 * | 2/2014 | Schulte | ................ | A61N 5/1077 382/128 |
| 8,654,923 B2 * | 2/2014 | Luan | ..................... | A61B 90/10 378/65 |

(Continued)

FOREIGN PATENT DOCUMENTS

| | | | | |
|---|---|---|---|---|
| DE | 10 2011 007 148 A1 * | 10/2012 | ............... | A61N 5/10 |
| EP | 2 510 978 B1 | 5/2014 | | |
| EP | 4 516 350 A1 | 3/2025 | | |

OTHER PUBLICATIONS

An English translation of DE102011007148 A1 by Patent Translate (Year: 2025).*

(Continued)

*Primary Examiner* — Allen C. Ho
(74) *Attorney, Agent, or Firm* — Foley & Lardner LLP

(57) ABSTRACT

Systems and methods for proton therapy treatment planning can include a treatment planning system determining positions of a plurality of energy layers across a dimension of a planning target volume (PTV) along a proton field direction, such that each pair of consecutive energy layers are spaced by a distance that is proportional to a width of a Bragg peak corresponding to at least one energy layer of the pair of energy layers. The treatment planning system can generate a proton therapy plan for irradiating the PTV according to the sequence of energy layers.

20 Claims, 7 Drawing Sheets

(56) References Cited

U.S. PATENT DOCUMENTS

| | | | | |
|---|---|---|---|---|
| 8,704,201 | B2* | 4/2014 | Schippers | A61N 5/10 |
| | | | | 250/516.1 |
| 9,855,445 | B2* | 1/2018 | Mansfield | A61N 5/1043 |
| 9,884,206 | B2* | 2/2018 | Schulte | A61N 5/103 |
| 10,549,117 | B2* | 2/2020 | Vanderstraten | A61N 5/1031 |
| 10,661,100 | B2* | 5/2020 | Shen | A61N 5/1075 |
| 10,716,954 | B2* | 7/2020 | Goebel | A61N 5/1077 |
| 10,786,687 | B2* | 9/2020 | Huth | A61N 5/1031 |
| 11,369,804 | B2* | 6/2022 | Soukup | A61N 5/1031 |
| 11,389,669 | B2* | 7/2022 | Traneus | A61N 5/1081 |
| 11,478,665 | B2* | 10/2022 | Snider, III | A61N 5/1042 |
| 12,076,587 | B2* | 9/2024 | Lansonneur | A61N 5/1031 |
| 2023/0405358 | A1 | 12/2023 | Lansonneur | |

OTHER PUBLICATIONS

An English translation of EP2510978 A1 by Patent Translate (Year: 2025).*

Melissa McIntyre et al., A Systematic Review of LET-Guided Treatment Plan Optimization in Proton Therapy: Identifying the Current State and Future Needs, Cancers (Basel). Aug. 25, 2023;15(17):4268. (Year: 2023).*

Dr. Adam Aitkenhead, Optimization of Medical Accelerators School, Jun. 8, 2017. (Year: 2017).*

Extended European Search Report dated Dec. 12, 2024 for EPO App. 24188104.4 (11 pages).

Hillbrand Martin et al: "Assessing a set of optimal user interface parameters for intensity-modulated proton therapy planning", Journal of Applied Clinical Medical Physics, vol. 11, No. 4, Sep. 1, 2010 (Sep. 1, 2010), pp. 93-104, XP093229521, US ISSN: 1526-9914, DOI: 10.1120/jacmp.v11 i4.3219 Retrieved from the Internet: URL:https://pmc.ncbi.nlm.nih.gov/articles/PMC5720409/pdf/ACM2-11-093.pdf.

Joanne H Kang et al: "Note; Non-uniform depth scanning for proton therapy systems employing active energy variation; Non-uniform depth scanning for proton therapy systems", Physics in Medicine and Biology, Institute of Physics Publishing, Bristol GB, vol. 53, No. 9, May 7, 2008 (May 7, 2008), pp. N149-N155, XP020133981, ISSN: 0031-9155.

G Meier et al., Contour scanning for penumbra improvement in pencil beam scanned proton therapy 2017 Phys. Med. Biol. 62 2398.

Mahboob ur Rehman et al., An optimized approach for robust spot placement in proton pencil beam scanning 2019 Phys. Med. Biol. 64 235016.

* cited by examiner

SYSTEMS AND METHODS FOR PLACEMENT OF ENERGY LAYERS AND SPOTS OF PROTON BEAMS IN TARGET REGIONS

TECHNICAL FIELD

The present application relates generally to systems and methods for proton therapy planning. Specifically, the present application relates to optimizing the placement of energy layers and the irradiated spots at each energy layer as part of proton therapy planning.

BACKGROUND

Proton beam therapy, also referred to herein as proton therapy, is a type of radiation treatment that uses a beam of protons rather than X-rays to deliver radiation to a tumor. Proton beam therapy provides more precision, e.g., compared to other types of radiation treatments, with respect to targeting the tumor and sparing healthy organs and tissue. As a result, proton therapy has fewer side effects than other types of radiation therapy. However, proton therapy uses expensive technology and equipment and is somewhat more expensive as a procedure than other types of cancer treatments. Due to the relatively high cost of the equipment, proton therapy is usually available at a limited number of cancer treatment facilities. For these reasons, proton beam therapy is typically used or recommended in cases where the tumor is close to critical organs such as the brain, head and neck, spine, heart, and GI tract.

In proton beam therapy, proton beams are designed or configured to release the bulk of their radiation energy within the targeted tumor. During treatment planning, a treatment planner can determine, e.g., based on medical imaging of a patient, parameters of the proton beams to be used to ensure that the bulk of the proton energy is released in the tumor. As such, the radiation energy is used to kill the tumor while sparing organs and tissue around the tumor or in the path of the proton beams.

SUMMARY

Embodiments described herein relate to optimizing proton therapy to improve efficacy, reduce session duration and reduce cost. When planning proton therapy sessions, some of the planning objectives or goals include achieving substantially uniform proton radiation or uniform distribution of proton energy within the tumor(s) and minimizing the number of proton beams used. The uniformity of the radiation within the tumor increases the likelihood of eradicating cancer cells in the patient's body while reducing or minimizing the number of proton beams reduces the cost of the radiation session and reduces the radiation session duration. A shorter session implies a shorter time duration during which the patient is expected to stay still and a better chance of radiation accuracy.

Embodiments described herein provide improved placement or distribution of energy layers and pencil beam spots within planning target volumes, e.g., tumors. The placement of the energy layers, according to embodiments herein, takes into account the variation in shape and energy of the Bragg peaks along the radiation field direction. In particular, any two consecutive energy layers are separated by a distance determined based on the width of the Bragg peak corresponding to one of the two layers. Also, the placement and separation of pencil beam spots within each layer may take into account the energy distribution of the spots. The distance between neighboring pencil beam spots can be determined based on one or more parameters of the energy distribution of the spots. Embodiments described herein allow for achieving substantially uniform radiation distribution within tumors while reducing or minimizing the total number of proton beams used.

According to one aspect, a treatment planning system can include one or more processors and a memory to store computer code instructions. The computer code instructions, when executed, can cause the one or more processors to determine positions of a sequence of energy layers across a dimension of a planning target volume (PTV) along a proton field direction, such that for each pair of consecutive energy layers of the sequence of energy layers a distance between the pair of consecutive energy layers is proportional to a width of a Bragg peak corresponding to an energy layer of the pair of energy layers. The one or more processors can generate a proton therapy plan for irradiating the PTV according to the sequence of energy layers.

In some implementations, the distance between the pair of consecutive energy layers can be proportional to a width of a Bragg peak corresponding to an energy layer of the pair of energy layers that is farther away from a source of a proton pencil beam. In some implementations, the width of the Bragg peak corresponding to the energy layer of the pair of energy layers can be equal to a full width half maximum (FWHM) of the Bragg peak along the proton field direction. In some implementations, the sequence of energy layers can extend between two ends of the PTV along the proton field direction.

In some implementations, each energy layer of the sequence of energy layers can be associated with a corresponding Bragg peak and the one or more processors can further determine, for each energy layer of the sequence of energy layers, an intensity of a corresponding proton pencil beam to generate the corresponding Bragg peak.

In some implementations, to determine the positions of the sequence of energy layers, the one or more processors can determine a first position of a first energy layer of the sequence of energy layers to overlap with a distal end of the PTV along the proton field direction, determine a first width of a first Bragg peak corresponding to the first energy layer, and determine a second position of a second energy layer of the sequence of energy layers to be at a distance from the first energy layer proportional to the first width of the first Bragg peak. The one or more processors can iteratively (i) determine a width of a Bragg peak corresponding to a current energy layer of the sequence energy layers, and (ii) determine a position of a subsequent energy layer of the sequence of energy layers to be at a distance from the current energy layer proportional to the width of the Bragg peak corresponding to the current energy layer. The subsequent energy layer can be closer to a source of a proton pencil beam compared to the current energy layer.

In some implementations, the one or more processors can further determine, for each energy layer of the sequence of energy layers, (i) a cross-sectional area of the PTV along the energy layer and (ii) positions of a plurality of radiation dose spots in the cross-sectional area. Each pair of adjacent radiation dose spots can be spaced by a distance smaller than or equal to a full width half maximum (FWHM) of the pair of adjacent radiation dose spots. Each radiation dose spot represents a radiation dose distribution within the cross-sectional area of a corresponding proton pencil beam. The one or more processors can further determine, for each energy layer of the sequence of energy layers, (i) a number $N_s$ of radiation dose spots in the cross-sectional area to be greater than or equal to $$N_s = \frac{4 \times A_l(PTV)}{\pi \times FWHM^2},$$

wherein $A_l(PTV)$ represents the cross-sectional area of the PTV across the energy layer. The one or more processors can further determine, for each radiation dose spot of the plurality of radiation dose spots in the cross-sectional area, an orientation of the corresponding proton pencil beam based on the position of the radiation dose spot.

According to one aspect, a proton therapy planning method can include determining, by one or more processors, positions of a sequence of energy layers across a dimension of a planning target volume (PTV) along a proton field direction, such that for each pair of consecutive energy layers of the sequence of energy layers a distance between the pair of consecutive energy layers is proportional to a width of a Bragg peak corresponding to an energy layer of the pair of energy layers. The method can include generating, by the one or more processors, a proton therapy plan for irradiating the PTV according to the sequence of energy layers.

In some implementations, the distance between the pair of consecutive energy layers can be proportional to a width of a Bragg peak corresponding to an energy layer of the pair of energy layers that is farther away from a source of a proton pencil beam. In some implementations, the width of the Bragg peak corresponding to the energy layer of the pair of energy layers can be equal to a full width half maximum (FWHM) of the Bragg peak along the proton field direction. In some implementations, the sequence of energy layers can extend between two ends of the PTV along the proton field direction.

In some implementations, each energy layer of the sequence of energy layers can be associated with a corresponding Bragg peak and the one or more processors can further determine, for each energy layer of the sequence of energy layers, an intensity of a corresponding proton pencil beam to generate the corresponding Bragg peak.

In some implementations, to determine the positions of the sequence of energy layers, the one or more processors can determine a first position of a first energy layer of the sequence of energy layers to overlap with a distal end of the PTV along the proton field direction, determine a first width of a first Bragg peak corresponding to the first energy layer, and determine a second position of a second energy layer of the sequence of energy layers to be at a distance from the first energy layer proportional to the first width of the first Bragg peak. The one or more processors can iteratively (i) determine a width of a Bragg peak corresponding to a current energy layer of the sequence energy layers, and (ii) determine a position of a subsequent energy layer of the sequence of energy layers to be at a distance from the current energy layer proportional to the width of the Bragg peak corresponding to the current energy layer. The subsequent energy layer can be closer to a source of a proton pencil beam compared to the current energy layer.

In some implementations, the one or more processors can further determine, for each energy layer of the sequence of energy layers, (i) a cross-sectional area of the PTV along the energy layer and (ii) positions of a plurality of radiation dose spots in the cross-sectional area. Each pair of adjacent radiation dose spots can be spaced by a distance smaller than or equal to a full width half maximum (FWHM) of the pair of adjacent radiation dose spots. Each radiation dose spot represents a radiation dose distribution within the cross-sectional area of a corresponding proton pencil beam. The one or more processors can further determine, for each energy layer of the sequence of energy layers, (i) a number $N_s$ of radiation dose spots in the cross-sectional area to be greater than or equal to $$N_s = \frac{4 \times A_l(PTV)}{\pi \times FWHM^2},$$

wherein $A_l(PTV)$ represents the cross-sectional area of the PTV across the energy layer. The one or more processors can further determine, for each radiation dose spot of the plurality of radiation dose spots in the cross-sectional area, an orientation of the corresponding proton pencil beam based on the position of the radiation dose spot.

According to yet one other aspect, a non-transitory computer-readable medium can include computer code instructions stored thereon. The computer code instructions, when executed, can cause one or more processors to determine positions of a sequence of energy layers across a dimension of a planning target volume (PTV) along a proton field direction, such that for each pair of consecutive energy layers of the sequence of energy layers a distance between the pair of consecutive energy layers is proportional to a width of a Bragg peak corresponding to an energy layer of the pair of energy layers. The one or more processors can generate a proton therapy plan for irradiating the PTV according to the sequence of energy layers.

Figure 1:
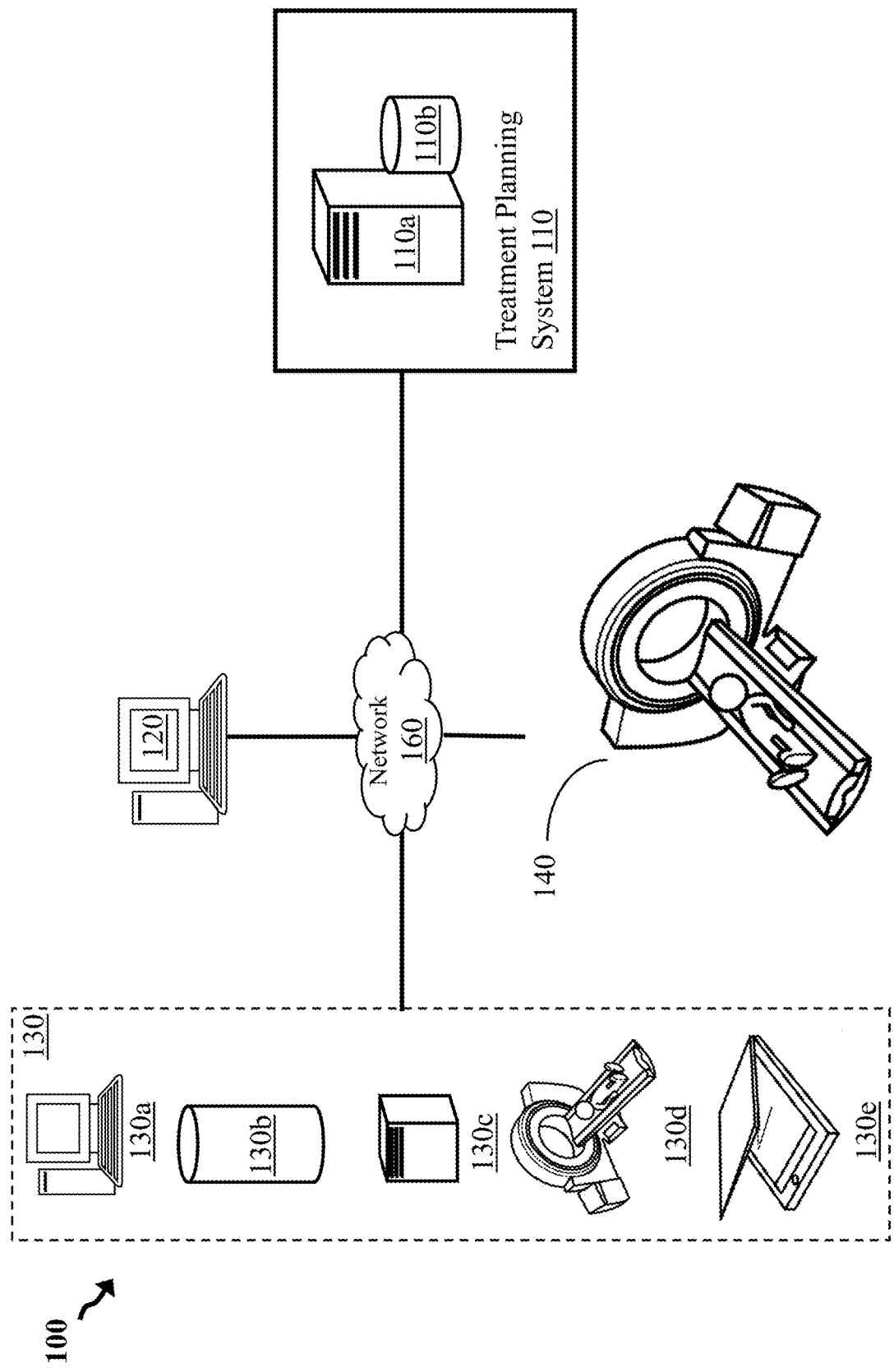
FIG. 1 shows a block diagram illustrating an example computer environment for implementing methods and processes described herein, according to an embodiment.

Some or all of the figures are schematic representations for purposes of illustration. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

DETAILED DESCRIPTION

Following below are more detailed descriptions of various concepts related to, and implementations of, methods, apparatuses, and systems for optimal placement of energy layers and spots of proton pencil beams within planning target volumes (PTVs). The various concepts introduced above and discussed in greater detail below may be implemented in any of numerous ways as the described concepts are not limited to any particular manner of implementation. Examples of specific implementations and applications are provided primarily for illustrative purposes.

An important advantage of proton beam therapy, e.g., over other types of radiation treatments, is that it allows physicians and/or medical staff to control where the protons release the bulk of their energy. In particular, by modulating the energy of proton beams, a treatment planner can control how deep protons may travel into the patient's body before releasing the bulk of their radiation energy. In other words, based on the energy of a proton beam, protons in the beam can penetrate through normal tissue in the patient's body and release a large amount of radiation energy when they reach cancer tissues to kill the cancer cells therein and then disappear instantly.

During a treatment plan, a proton beam machine can radiate a plurality of spots of a tumor with a proton pencil beam. In particular, the proton beam machine can scan the tumor according to predefined sports or spot locations. The number and locations of the pencil beam spots are determined during the proton therapy planning phase. A first objective of the planning phase is to determine a placement or distribution of pencil beam spots within the tumor that will lead to uniform or substantially uniform distribution of proton radiation energy within the tumor. If a region of the tumor receives a relatively low radiation dose, the cancer cells in that region will most likely survive the radiation session leading to a regeneration of the tumor. As such, the placement or distribution of the pencil beam spots within the tumor plays an important role in boosting the efficacy of the proton beam therapy treatment.

A second objective of the planning phase is to minimize or reduce the number of proton beams used in a given radiation session for various reasons. First, the larger the number of proton beams used, the longer the radiation session and the longer the patient can be expected to stay still. For instance, one of the techniques used to reduce the amount of radiation to critical organs close to the tumor is to have patients hold their breath while receiving radiation therapy. The longer the radiation therapy, the more difficult it is for patients to comply with breath holding and the more likely that critical organs will receive a higher radiation dose than anticipated. Furthermore, in general, it is desired to reduce or minimize the amount of radiation received by a patient to avoid or mitigate radiation-related side effects. Also, the cost of a proton therapy treatment session increases with the increase in the number of produced or used proton beams. By minimizing or reducing the total number of proton beams used, the cost of the treatment is also reduced.

One technical problem associated with the treatment planning can be described as where should the proton pencil beam spots be placed or distributed in the tumor to achieve a uniform or substantially uniform radiation within the tumor while minimizing or reducing the total number of spots. Embodiments described herein address this technical problem and provide an approach for placing the pencil beam spots that takes into account the shape characteristics of the Bragg curves describing the energy loss of the protons in a medium. In particular, distances between consecutive energy layers are determined based on the width of Bragg peaks associated with energy layers. Also, the distance between neighboring pencil beam spots within a given energy layer depends on characteristics of the distribution of the released radiation energy of each spot.

Embodiments described herein relate to systems and methods for optimizing placement of energy layers and pencil beam spots at each energy layer as part of proton therapy planning. The system and methods include determining positions of energy layers across a dimension of a planning target volume (PTV) along a proton field direction, such that the distance between two consecutive energy layers is proportional to, or equal to, a width of a Bragg peak corresponding to one of the two energy layers. Within a given energy layer, the systems and methods described herein can include placing pencil beam spots such that neighboring pencil beam spots are positioned from one another at a distance proportional to, or equal to, a full width half maximum (FWHM) of the spots along the energy layer.

A. Computing and Network Environment for Proton Therapy Treatment Planning

FIG. 1 illustrates an example computer environment 100 that can be used to provide a network-based implementation of the methods described herein. The computer environment 100 can include a treatment planning system 110 (also referred to herein as proton therapy planning system 110), a user computing device 120, electronic data sources 130*a-e* (referred to herein collectively as electronic data source 130) and a proton radiation therapy system 140. The radiotherapy treatment planning system 110 can include one or more computing devices 110*a* (e.g., one or more computer servers) and one or more databases 110*b*. The above-mentioned components may be connected to each other through a network 160. The computer environment 100 is not necessarily confined to the components described herein and may include additional or alternate components, not shown for brevity, which are to be considered within the scope of the embodiments described herein.

Examples of the network 160 may include, but are not limited to, private or public LAN, WLAN, MAN, WAN, and the Internet. The network 160 may include both wired and wireless communications according to one or more standards and/or via one or more transport mediums. The communication over the network 160 may be performed in accordance with various communication protocols such as Transmission Control Protocol and Internet Protocol (TCP/IP), User Datagram Protocol (UDP), and IEEE communication protocols. In one example, the network 160 may include wireless communications according to Bluetooth specification sets or another standard or proprietary wireless communication protocol. In another example, the network 160 may also include communications over a cellular network, including, e.g., a GSM (Global System for Mobile Communications), CDMA (Code Division Multiple Access), EDGE (Enhanced Data for Global Evolution) network.

In some implementations, the computing device(s) 110*a* can be configured to execute computer instructions to perform any of the methods described herein or operations thereof. The computing device(s) 110*a* may generate and display an electronic platform to display information indicative of, or related to, parameters of a radiation treatment plan. The electronic platform may include graphical user interface (GUI) displayed on the user computing device 120. An example of the electronic platform generated and hosted by the computing device(s) 110*a* may be a web-based application or a website configured to be displayed on different electronic devices, such as mobile devices, tablets, personal computer, and the like (e.g., user computing device 120).

The computing device(s) 110a may host a website accessible to end-users, where the content presented via the various webpages may be controlled based upon each particular user's role or viewing permissions. The computing device(s) 110a may be any computing device comprising a processor and non-transitory machine-readable storage capable of executing the various tasks and processes described herein. Non-limiting examples of such computing devices may include workstation computers, laptop computers, server computers, laptop computers, and the like. While the computer environment 100 in FIG. 1 includes a single computing device 110a, in some configurations, the treatment planning system 110 may include any number of computing devices 110a, e.g., operating in a distributed computing environment.

The computing device(s) 110a may execute software applications configured to display the electronic platform (e.g., host a website), which may generate and serve various webpages to each user computing device 120. Different users operating the user computing device(s) 120 may use the website to view and/or interact with the output treatment plans, or input parameter values and/or constraints used to generate the treatment plan, e.g., clinical goals, weighting coefficients or a combination thereof, among others.

In some implementations, the computing device(s) 110a may be configured to employ user authentication based upon a set of user authorization credentials (e.g., username, password, biometrics, cryptographic certificate, and the like). In such implementations, the computing device(s) 110a may access the system database(s) 110b configured to store user credentials, which the computing device(s) 110a may be configured to reference in order to determine whether a set of entered credentials (purportedly authenticating the user) match an appropriate set of credentials that identify and authenticate the user.

In some configurations, the computing device(s) 110a may generate and host webpages based upon a particular user's role (e.g., administrator, employee, and/or bidder). In such implementations, the user's role may be defined by data fields and/or input fields in user records stored in the system database(s) 110b. The computing device(s) 110a may authenticate the user and may identify the user's role by executing an access directory protocol (e.g., LDAP). The computing device(s) 110a may generate webpage content that is customized according to the user's role defined by the user record in the system database(s) 110b.

In some embodiments, the computing device(s) 110a receives medical images, masks and/or medical data indicative of medical goals from a user (or retrieve from a data repository), process the data, and displays an indication of the treatment trajectory on the electronic platform. For instance, in a non-limiting example, a user operating the computing device 130a uploads a series of images of a CT scan or other medical images using the electronic platform. The computer server(s) 110a can determine the treatment trajectory based on input data, and display the results via the electronic platform on the user computing device 120 or the computing device 130a. The user computing device 120 and/or the computing device 130a may be any computing device comprising a processor and a non-transitory machine-readable storage medium capable of performing the various tasks and processes described herein. Non-limiting examples of a network node may be a workstation computer, laptop computer, tablet computer, and server computer. In operation, various users may use user computing devices 120 and or computing device 130a to access the GUI operationally managed by the computer device(s) 110a.

The electronic data sources 130 may represent various electronic data sources that contain and/or retrieve medical images of patients. For instance, database 130b and third-party server 130c may represent data sources providing the corpus of data (e.g., medical images, masks or other medical data) needed for the computing device(s) 110a to determine radiation treatment plans. The computer server(s) 110a may also retrieve the data directly from a medical scanner 130e and/or medical imaging device 130d (e.g., CT scan machine).

In some implementations, the methods described herein or operations thereof can be implemented by the user device 120, any of the electronic devices 130, the proton beam system or device 140 or a combination thereof. Once a treatment plan is determined, the computing device(s) 110a or the treatment planning system 110 can provide an indication of the treatment plan or parameters thereof to the proton beam system or device 140 or use to radiate target regions of the patient according to the treatment plan. The proton beam system or device 140 can include the computing system or computing components thereof. The proton beam system or device 140 can include other components which are discussed in relation with FIG. 2 below.

While FIG. 1 shows a network based implementation, it is to be noted that methods described herein can be implemented by a single computing device that receives the medical images and medical data for a patient and determines a radiation treatment trajectory or path according to methods described herein.

The features depicted in FIG. 1 and discussed herein may include a computing system comprising various features, such as one or more processors to execute computer code instructions, a memory and a bus communicatively coupling the processor and the memory. The one or more processors can include a microprocessor, a general purpose processor, a multi-core processor, a digital signal processor (DSP) or a field programmable gate array (FPGA), an application-specific integrated circuit (ASIC) or other type of processor. The one or more processors can be communicatively coupled to the bus for processing information. The memory can include a main memory device, such as a random-access memory (RAM) or other dynamic storage device, coupled to the bus for storing information and instructions to be executed by the processor(s). The main memory device can be used for storing temporary variables or other intermediate information during execution of instructions (e.g., related to methods described herein such as method 300) by the processor(s). The computing system can include a read-only memory (ROM) or other static storage device coupled to the bus for storing static information and instructions for the processor(s). For instance, the ROM can store medical images or other medical data of patients, for example, received as input. The ROM can store computer code instructions related to, or representing an implementation of, methods described herein. A storage device, such as a solid state device, magnetic disk or optical disk, can be coupled to the bus for storing (or providing as input) information and/or instructions.

The computing system can be communicatively coupled to, or can include, an input device and/or an output device. The computing system can be coupled via the bus to the output device. The output device can include a display device, such as a Liquid Crystal Display (LCD), Thin-Film-Transistor LCD (TFT), an Organic Light Emitting Diode (OLED) display, LED display, Electronic Paper display, Plasma Display Panel (PDP), or other display, etc., for displaying information to a user. The output device can include a communication interface for communicating information to other external devices. An input device, such as a keyboard including alphanumeric and other keys, may be coupled to the bus for communicating information and command selections to the processor. In some implementations, the input device may be integrated within a display device, such as in a touch screen display. The input device can include a cursor control, such as a mouse, a trackball, or cursor direction keys, for communicating direction information and command selections to the processor and for controlling cursor movement on the display device.

According to various implementations, the methods described herein or respective operations can be implemented as an arrangement of computer code instructions that are executed by the processor(s) of the computing system. The arrangement of computer code instructions can be read into main memory device from another computer-readable medium, such as the ROM or the storage device. Execution of the arrangement of computer code instructions stored in main memory device can cause the computing system to perform the methods described herein or operations thereof. In some implementations, one or more processors in a multi-processor arrangement may be employed to execute the computer code instructions representing an implementation of methods or processes described herein. In some other implementations, hard-wired circuitry may be used in place of or in combination with software instructions to effect illustrative implementation of the methods described herein or operations thereof. In general, implementations are not limited to any specific combination of hardware circuitry and software. The functional operations described in this specification can be implemented in other types of digital electronic circuitry, in computer software, firmware, hardware or a combination thereof.

In some implementations, the computing system can include a plurality of computing devices, e.g., operating in a distributed computing environment. The computing system can represent an example implementation of the radiotherapy planning system 110.

Figure 2:
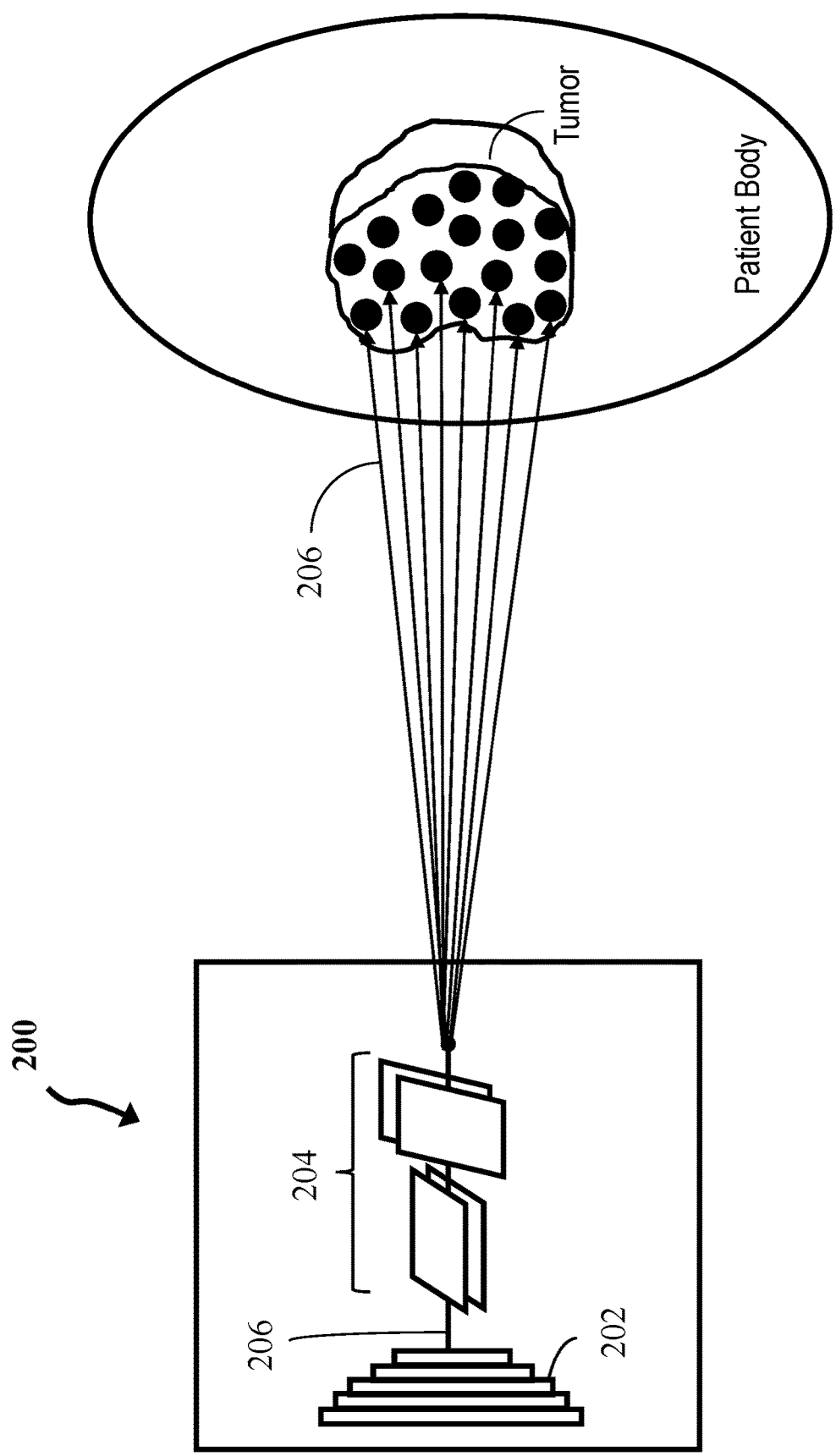
FIG. 2 is a block diagram depicting an example proton beam radiation system, according to an embodiment.

FIG. 2 shows a block diagram depicting a proton beam system 200, according to example embodiments herein. The proton beam system 200 can include an energy modulator 202 to modulate the energy or intensities of various proton pencil beams 206. The proton beam system 200 can include a spot position monitor 204 to control the positions of pencil beam spots on various energy layers. In other words, the spot position monitor 204 can control the orientation of proton pencil beams 206 to project on corresponding beam spots. The spot position monitor 204 can include magnets to steer the pencil beam(s) 206 to desired orientation angles.

B. Optimizing Placement of Energy Layers and Spots of Proton Pencil Beams in PTVs In various types of radiation therapies, objectives of the treatment planning include applying a sufficient amount of radiation dose across the planning target volume (PTV), e.g., tumor, in order to kill cancer cells and sparing as much as possible organs and normal tissue close to the PTV or along the radiation path from unnecessary radiation. In proton beam therapy, and intensity-modulated proton therapy (IMPT) in particular, applying sufficient radiation dose to kill cancer cells implies applying a uniform, or substantially uniform, and highly conformal radiation within the PTV. Conformality means that proton beam spots (e.g., three-dimensional (3D) spots) are arranged to closely cover or fit the PTV. Uniformity (or substantial uniformity) of the radiation energy implies that all points or regions in the PTV receive a similar radiation dose, e.g., greater than or equal to the prescribed radiation dose. Heterogeneities or gaps in the radiation dose distribution can lead to some cancer cells surviving the proton therapy allowing the tumor to regenerate.

In the treatment planning phase, the treatment planner or the treatment planning system 110 can first determine field direction. Given the field direction, the treatment planner or the treatment planning system 110 can generate, or determine positions of, energy layers within the PTV. The energy layers can be viewed as planes perpendicular to the field direction and cutting through the PTV. The energy layers are associated with different energy levels and represent cross-sectional planes of the PTV at which proton beams are expected or designed to release the bulk of their energy. In some implementations, the treatment planning system 110 can generate or place the energy layers to have equidistant spacing, e.g., 3 mega electron volts (MeV). The spacing between consecutive energy layers can be defined as a difference between the energy levels (e.g., in MeV) of energy layers since the depth reached by a proton beam into the patient's body (or some other medium) is a function of its energy. Between 70 MeV and 250 MeV (typical range used clinically), the distance traveled by the proton is approximately linearly proportional to the proton energy. The treatment planning system 110 can arrange the energy layers to extend approximately between two opposite ends of the PTV along the field direction. For example, the treatment planning system 110 can place the most distal layer to cover or overlap with a deepest part of the PTV along the field direction. The treatment planning system 110 can then place subsequent layers with equidistant spacing (e.g., every 3 MeV) moving towards the proximal end of the PTV along the field direction so that the energy layers extend between opposite ends (a distal end and a proximal end) of the PTV along the field direction.

Once the energy layers are defined or placed, the treatment planning system 110 can place, or determine positions of, proton pencil beam spots in each energy layer. In particular, the treatment planning system 110 can determine the cross-sectional area or region of the PTV along each energy layer, and place a set of proton pencil beam spots in each cross-sectional area defined by a corresponding energy layer. The treatment planning system 110 can place proton pencil beam spots in each layer according to a predefined grid, such as a rectangular or hexagonal grid. In some implementations, the treatment planning system 110 can use a contour-based positioning the pencil beam spots in each cross-sectional area of the PTV defined by a corresponding energy layer. For instance, the treatment planning system 110 can place spots on the contour of the cross-sectional area of the PTV along an energy layer, and place additional spots inside the cross-sectional area according to concentric contours. Once the energy layer positions and the beam spot positions are calculated or determined, the treatment planning system 110 can determine the weights or parameters of individual spots or pencil beams. For example, the treatment planning system 110 can determine or optimize the number of protons delivered in each pencil beam or at each beam spot to fulfil or satisfy dosimetric objectives defined by the clinician.

Figure 3:
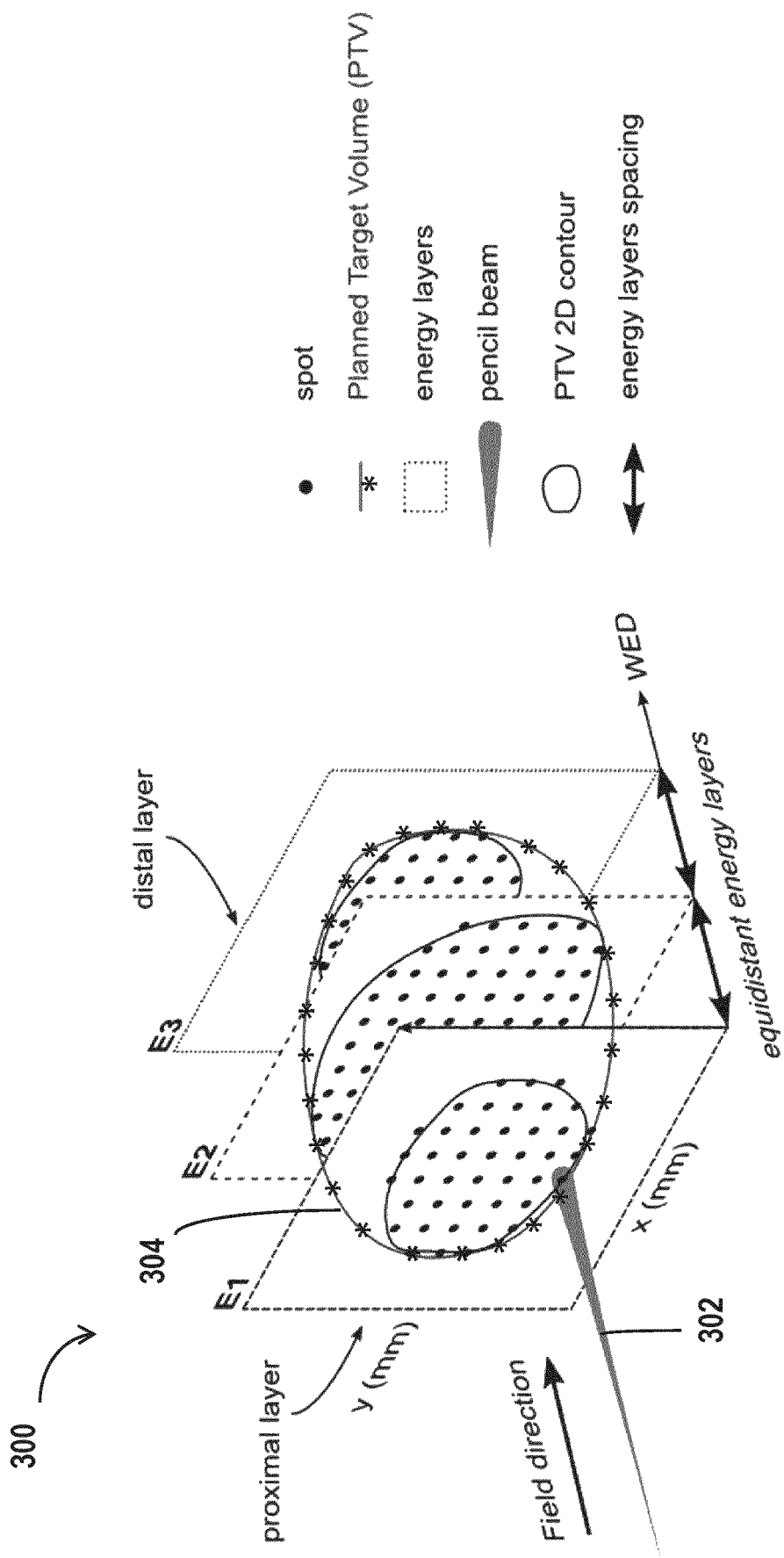
FIG. 3 is a diagram illustrating an example placement of energy layers within a PTV.

Referring to FIG. 3, a diagram illustrating a placement 300 of energy layers with equidistant spacing is shown. In intensity-modulated proton therapy (IMPT), proton pencil beams 302 scan a PTV 304 to irradiate cancer cells therein. The concepts discussed here are described as being performed by a treatment planning system, such as the treatment planning system 110, depicted in FIG. 1. However, in other embodiments, other processors can perform one or more of the steps discussed herein. The treatment planning system can define three energy layers denoted E1, E2 and E3 with equidistant spacing, which slice the PTV 304. The energy layers can be viewed as corresponding to the depths reached by the pencil beam(s) 302 going through the patient. In other words, a first set of proton pencil beams 302 can be designed or configured to penetrate into the patient's body until they reach the energy layer E1 where they release the bulk of their radiation energy. Another set of pencil beams 302 can be designed or configured to penetrate into the patient's body until they reach the energy layer E2 where they release the bulk of their radiation energy. A third set of pencil beams 302 can be designed or configured to penetrate into the patient's body until they reach the energy layer E3 where they release the bulk of their radiation energy.

Protons lose or release energy as they travel through a medium according to the Bragg curve with the bulk of the radiation energy released at the Bragg peak. The location and amplitude of the Bragg peak depend on the amount of energy the proton has. Each energy layer corresponds to a respective Bragg peak. Specifically, each energy layer is associated with a corresponding Bragg curve and coincides with the Brag peak of that curve. Placing the energy layers according to an equidistant spacing results in equidistant Bragg peaks within the PTV along the field direction.

When arranging energy layers according to an equidistant spacing, the number of energy layers and the spacing between each pair of consecutive energy layers are typically selected by the treatment planner based on the experience and skillset of the planner. Also, the distance between two neighboring spots (or the spot spacing) is an arbitrary value defined by the planner. This approach of defining the positions of the energy layers and beam spots has at least two limitations. First, the approach leads to suboptimal plan quality, especially for complex PTV shapes. In other words, the final placement of energy layers and beam spots may not lead to uniform or substantially uniform radiation within the PTV. Also, the treatment duration can be unnecessarily long since the time duration of delivering the field or radiation beams scales with the number of energy layers and the number of spots. An IMPT field can be viewed as having multiple energy layers with each layer containing a corresponding plurality of proton pencil beams or a corresponding plurality of pencil beam spots. Each spot represents a location or distribution of the bulk energy release of a corresponding proton pencil beam.

To improve the quality and efficacy of proton therapy treatments, a fully automated and patient-specific approach for generating or determining the positions of energy layers that takes into account the interplay or relationship between two consecutives energy layers is described herein. The treatment planning system takes into account the widths of the Bragg peaks corresponding to the energy layers when placing the energy layers in the PTV. In other words, the treatment planning system takes into account the physics of energy release by protons (or the shapes of the Bragg curves) to optimize placement of the energy layers. The treatment planning system also takes into account the geometry of the PTV. Taking into account the energy release pattern along the field direction when placing the energy layers allows for uniform or substantially uniform radiation energy within the PTV along the field direction while minimizing or reducing the total number of energy layers.

Furthermore, the treatment planning system can take into account the shape or distribution of each beam spot in placing the spots in each energy layer. A pencil beam spot can be viewed as representing or indicative of the distribution of bulk energy release by the corresponding proton pencil beam when it reaches the corresponding energy layer. Considering the energy distribution associated with each proton pencil beam in placing the beam spots leads to uniform or substantially uniform radiation along each energy layer or in directions perpendicular to the field direction.

Figure 4:
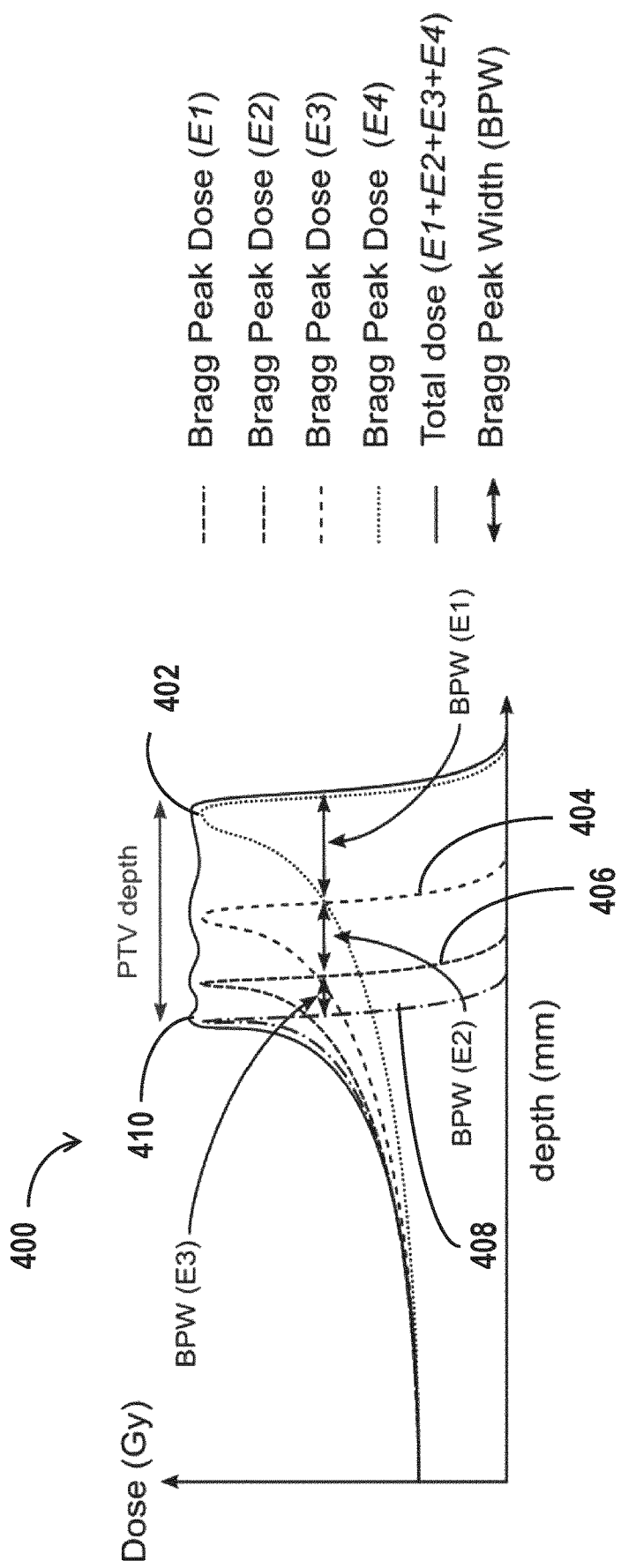
FIG. 4 shows a plot depicting radiation dose profiles for different energy levels and a cumulative radiation dose profile, according to an embodiment.

Referring now to FIG. 4, a plot 400 radiation dose profiles for different energy levels and a cumulative radiation dose profile are shown, according to example embodiments herein. The x-axis represents the penetration depth of the proton pencil beams in water. The radiation dose (or energy release profile) of each proton pencil beam follows a corresponding Bragg curve. The shape of each Bragg curve depends on the energy level of the corresponding proton pencil beam. The higher is the energy level, the higher is the amplitude of the corresponding Bragg peak and the deeper is the position of the Bragg peak. For example, the energy release profile 402 has the highest energy level E1 leading to a corresponding Bragg peak with the highest amplitude and highest depth. The energy release profile 404 has the second highest energy level E2 leading to a corresponding Bragg peak with the second highest amplitude and second highest depth. The energy release profile 406 has the third highest energy level E3 leading to a corresponding Bragg peak with the third highest amplitude and third highest depth. Finally, the energy release profile 408 has the lowest energy level E4 leading to a corresponding Bragg peak with the smallest amplitude and smallest depth. While FIG. 4 shows the energy levels E1, E2, E3 and E4 to be equal (or about equal) to each other, typically E1>E2>E3>E4. Proximal Bragg peaks (least penetrating Bragg peaks) have the lowest energies and contribute the least to the cumulative radiation dose profile 410.

Also, the pencil beams have typically a narrower Bragg peak at lower energies. For example, the Bragg peak associated with the energy E1 is the widest and the width of the Bragg peaks decreases with decreasing energy levels. To create a homogeneous radiation dose distribution within the PTV, it is more efficient to make the spacing between consecutive energy layers proportional to, or dependent on, the Bragg peak width of at least one of the consecutive energy layers. For example, the cumulative radiation dose profile 410 representing the sum of the profiles 402, 404, 406 and 408 is substantially uniform along the field direction. Also, compared to the placement of the energy layers according to constant or equidistant spacing between consecutive energy layers, the use of Bragg peak widths to determine the spacing between consecutive energy layers allows for minimizing or reducing the total number of energy layers placed or used in the PTV. The width of each Bragg peak can be equal to the FWHM of the Bragg peak along the proton field direction.

Figure 5:
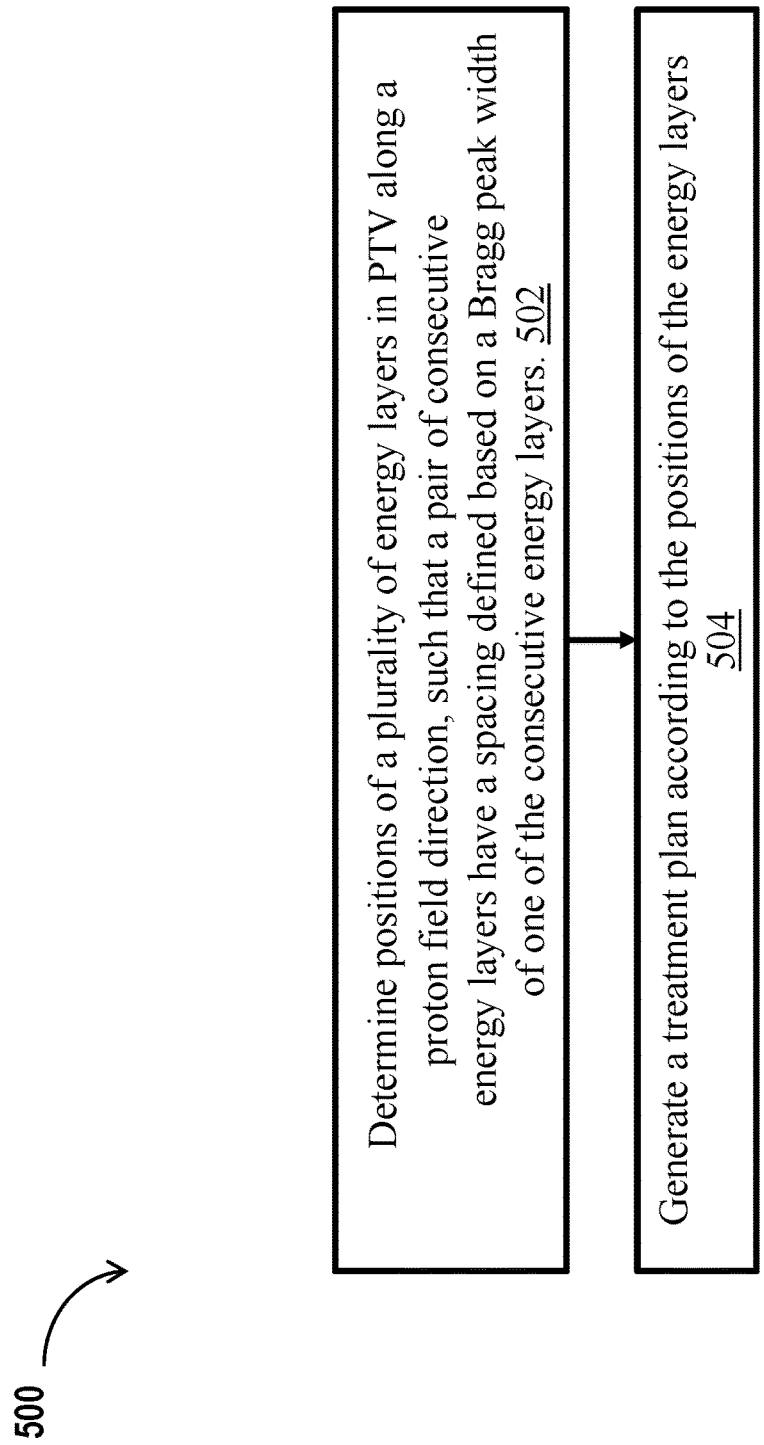
FIG. 5 is a flowchart illustrating a method proton therapy planning, according to an embodiment.

Referring now to FIG. 5, a flowchart illustrating a method 500 of proton therapy planning is shown, according to example embodiments. In overview, the method 500 can include a treatment planning system, such as the treatment planning system 110, depicted in FIG. 1, determining positions of a plurality of energy layers within the PTV along a proton field direction, such that a distance or spacing between a pair of consecutive energy layers is determined or defined based on a Bragg peak width of one of the consecutive energy layers (step 502). The method 500 can include the treatment planning system generating a proton therapy treatment plan for irradiating the PTV according to the energy layers (step 504).

The method 500 can include a treatment planning system determining positions of a plurality of energy layers within the PTV along a proton field direction, such that a distance or spacing between a pair of consecutive energy layers is determined or defined based on a Bragg peak width of one of the consecutive energy layers (step 502). The treatment planning system can determine positions of a sequence of energy layers across a dimension of a planning target volume (PTV) along a proton field direction, such that for each pair of consecutive energy layers of the sequence of energy layers a distance between the pair of consecutive energy layers is proportional to a width of a Bragg peak corresponding to an energy layer of the pair of energy layers. For example, the treatment planning system can determine the distance between the pair of consecutive energy layers to be equal to the Bragg peak width of one of the pair of consecutive energy layers or a fraction thereof. The treatment planning system can determine the distance between the pair of consecutive energy layers to be smaller than or equal to the Bragg peak width of one of the pair of consecutive energy layers.

In some implementations, the treatment planning system can determine the distance between the pair of consecutive energy layers based on the width of the Bragg peak corresponding to the distal or deepest energy layer of the pair of energy layers (e.g., the energy layer that is farther away from a source of a proton pencil beam). In other words, the treatment planning system can determine the distance between the pair of consecutive energy layers based on the width of the Bragg peak corresponding to the energy layer with the highest energy among the pair of energy layers.

In some implementations, to determine the positions of the sequence of energy layers, the treatment planning system can determine a first position of (or place) a first energy layer of the sequence of energy layers to overlap with or cover a distal or deepest end or region of the PTV along the proton field direction. For example, the treatment planning system can place the first energy layer at a deepest point of the PTV along the proton field direction. The treatment planning system can determine a first width of a first Bragg peak corresponding to the first energy layer. For instance, the treatment planning system can determine, e.g., based on the patient's imaging data, a first Bragg curve with a Bragg peak overlapping with or located at the first position. The treatment planning system can use energy lease profiles in water, such as profiles 402, 404, 406 and 408 in FIG. 4, to determine the first Bragg curve or energy profile for the patient's anatomy with a first Bragg peak located at or overlapping with the first position. The treatment planning system can then determine a width of the first Bragg peak of the determined energy profile.

The treatment planning system can determine a second position of a second energy layer of the sequence of energy layers to be at a distance or spacing from the first energy layer proportional to the first width of the first Bragg peak. For example, the spacing can be equal to the first width of the first Bragg peak or a fraction thereof. The spacing can be smaller than or equal to the first width of the first Bragg peak. Once the position of the second energy layer is determined, the treatment planning system can determine a second Bragg curve for the second energy layer and determine a width of the Bragg peak of the second Bragg curve for use to determine the spacing or distance to the next energy layer.

The treatment planning system can repeat the above process for the next energy layers until the energy layers cover the depth of the PTV along the field direction. For instance, the treatment planning system can iteratively (i) determine a width of a Bragg peak corresponding to a current energy layer of the sequence energy layers, and (ii) determine a position of a subsequent energy layer of the sequence of energy layers to be at a distance from the current energy layer proportional to the width of the Bragg peak corresponding to the current energy layer. The subsequent energy layer can be closer to a source of a proton pencil beam compared to the current energy layer. In other words, the subsequent energy layer has a lower energy level compared to the energy level of the current energy layer.

The placement of energy layers can be summarized as follows. The treatment planning system can place or determine the first energy layer such that the range of the corresponding proton beam(s) match the depth of the distal edge of the PTV along the field direction. The treatment planning system can place or determine the second energy layer to be spaced by the Bragg peak width of the first energy layer. The treatment planning system can add or place the $n^{th}$ energy layer to be spaced from the $(n-1)^{th}$ energy layer, by the Bragg peak width of the $(n-1)^{th}$ energy layer. The treatment planning system can repeat the placement or addition of energy layers until the proximal edge of the PTV is reached. The energy layers can extend between two opposite or extreme ends of the PTV along the field direction.

The most proximal energy layers have the lowest energy levels and can have relatively low or minimal contributions to the cumulative radiation energy in the PTV compared to the dose contribution(s) from the plateau regions of the higher-energy layers. In some implementations, the treatment planning system can drop or remove one or more proximal energy layers (or energy layers with relatively low energy levels) to further optimize the treatment plan or reduce the total number of energy layers without affecting the uniformity of the radiation energy within the PTV.

For each energy layer, the treatment planning system can (i) determine a cross-sectional area of the PTV along the energy layer and (ii) determine positions of a plurality of pencil beam spots (or beam spots) in the cross-sectional area. The treatment planning system 110 can set or determine the spacing or distance between each pair of adjacent radiation dose spots to be smaller than or equal to a full width half maximum (FWHM) of at least one of the pair of adjacent radiation dose spots. The dose profiles of individual spots, measured on a plane orthogonal to the field or beam direction can be safely approximated by a two-dimensional Gaussian distribution. To get a satisfactory dose homogeneity or uniformity with respect to the cumulative radiation dose distribution in the PTV, a good choice is to space the spots by their full width half maximum (FWHM) or a fraction thereof. Spacing the spots by more than the FWHM usually results in clinically unsatisfactory cumulative radiation dose distribution in the PTV.

Figure 6:
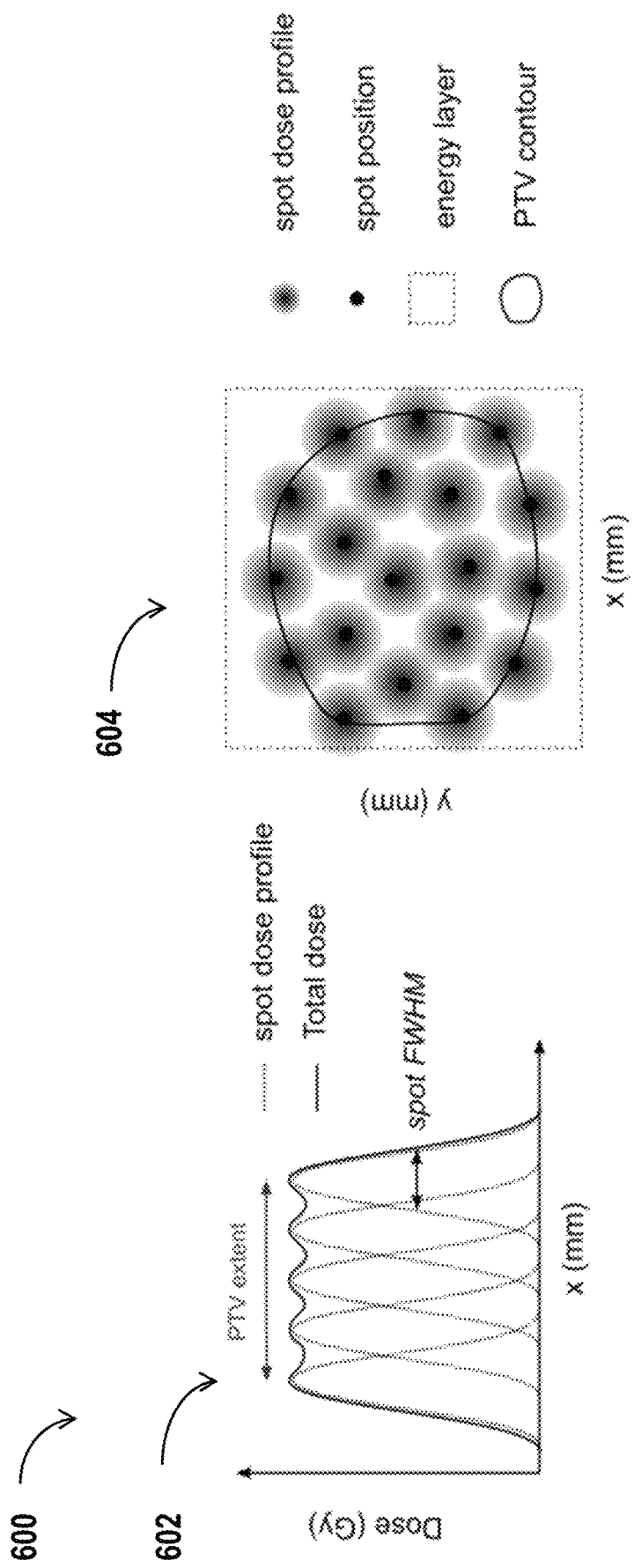
FIG. 6 show a diagram depicting placement of pencil beam spots in an energy layer, according to an embodiment.

FIG. 6 shows an approach 600 of placing pencil beam spots in an energy layer, according to embodiments herein. The plot 602 (left) depicts one-dimensional Gaussian distributions of pencil beam spots and the corresponding cumulative one-dimensional dose distribution. Summing up the Gaussian distributions results in a uniform or substantially uniform dose distribution when the spacing between spots is proportional to their FWHM or a fraction thereof. The diagram 604 (on the right) depicts two-dimensional radiation dose profiles (or distributions) of individual spots measured on a plane or energy layer orthogonal to the beam direction. To get a homogeneous cumulative dose distribution in the PTV, a treatment planning system (e.g., the treatment planning system 110) places the individual spots to cover the cross-sectional area of the PTV within the PTV contour for the corresponding energy layer.

Considering the spacing between neighboring spots within each energy layer being smaller than or equal to FWHM of the spots, the treatment planning system can determine a minimum number of pencil beam spots $N_s$ in a given energy layer. The treatment planning system can determine, for an energy layer with index 1, the number of radiation dose spots in the cross-sectional area to be greater than or equal to $$N_s = \frac{4 \times A_l(PTV)}{\pi \times FWHM^2},$$

wherein $A_l(PTV)$ represents the cross-sectional area of the PTV across the energy layer. Note that for most machines, the spot FWHM decreases as the proton energy decreases. Therefore, the spots in the proximal layers (with low energy) would be more densely packed than the ones located in the distal layers (with high energy). Note that removing any spots would result in a level of heterogeneity that would not be clinically acceptable, therefore this placement is pareto optimal with respect to the treatment time.

Referring back to FIG. 5, the method 500 can include the treatment planning system generating a proton therapy plan for irradiating the PTV according to the sequence of energy layers (step 504). As discussed above, each energy layer can be associated with a corresponding Bragg curve having a Bragg peak. The treatment planning system can use the Bragg peak or the energy level corresponding to energy layer to determine an intensity of a corresponding proton pencil beam to generate or produce the corresponding Bragg peak. The treatment planning system can determine, for each energy layer, an intensity of corresponding proton pencil beams to produce the beam spots in the energy layer.

The treatment planning system can determine, for each pencil beam spot (or beam spot) an orientation of the corresponding proton pencil beam based on the position of the radiation dose spot. The orientation can include an angle of the pencil beam spot, e.g., relative to the field direction. In some implementations, a multi-leaf collimator may be used to generate pencil beams at different orientations. In such case, the treatment plan can determine a separate setting of the multi-leaf collimator for each proton pencil beam or spot.

The treatment plan can include the field direction and intensities (or energies), orientations and/or multi-leaf collimator settings of the various proton pencil beams. The treatment planning system can provide the treatment plan or parameters thereof to the proton beam system or other machines (e.g., machine 140 or 200) for use to radiate the PTV according to the treatment plan.

Figure 7:
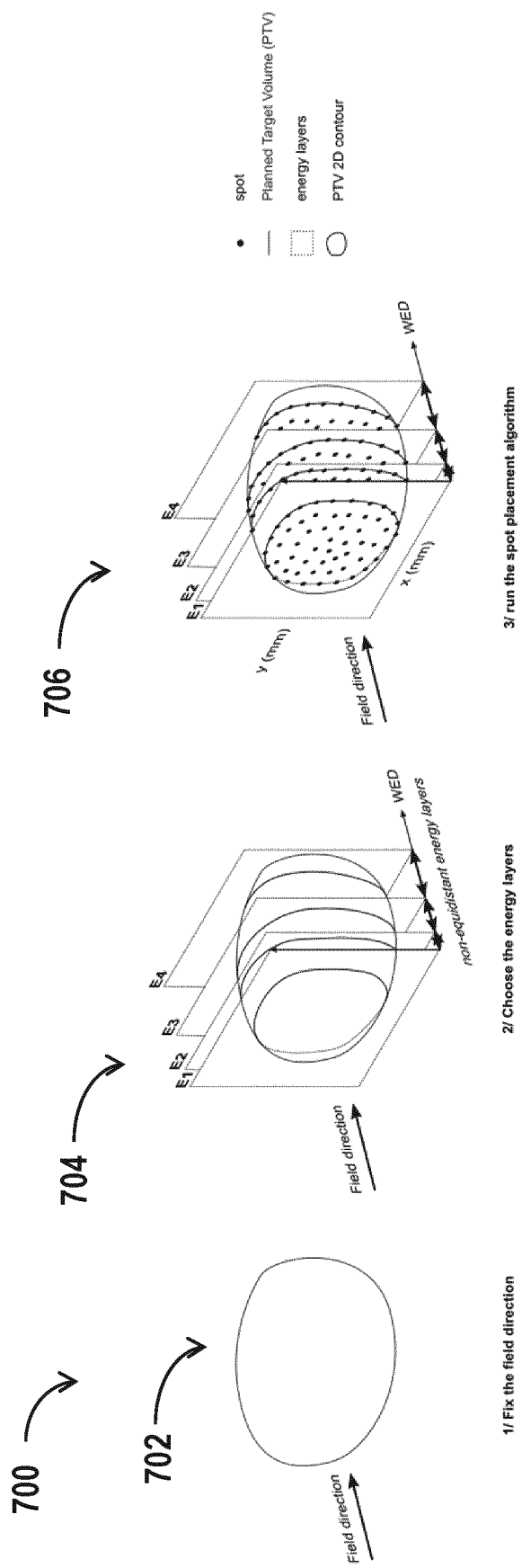
FIG. 7 show a diagram depicting a process of proton therapy treatment planning, according to an embodiment.

FIG. 7 show a diagram depicting a process 700 of proton therapy treatment planning, according to embodiments herein. First, a treatment planning system (e.g., the treatment planning system 110) can determine a radiation field direction. At a first stage 702, the treatment planning system 110 can determine the radiation field direction automatically based on medical images of the patient, or can receive an indication of the field direction as input from the planner. At a second stage 704, the treatment planning system can determine the positions and energy levels of the energy layers as discussed above with regard to FIGS. 4 and 5. At a third stage 706, the treatment planning system can determine the positions of beam spots at each energy layer as discussed above with regard to FIG. 6. Once the energy layers and the beam spots, or positions thereof, are determined, the treatment planning system can determine various parameters of the proton beams.

Embodiments described herein provide an improved technical solution for proton therapy planning. Using the 3D geometry of the PTV and the 3D dose profiles of proton pencil beams, the systems and methods described herein may optimize the number of spots and energy layers as well as their locations in the PTV.

Each method or process described in this disclosure can be carried out by computer code instructions stored on computer-readable medium. The computer code instructions, when executed by one or more processors of a computing device, can cause the computing device to perform that method.

While the disclosure has been particularly shown and described with reference to specific embodiments, it should be understood by those skilled in the art that various changes in form and detail may be made therein without departing from the spirit and scope of the invention described in this disclosure.

While this disclosure contains many specific embodiment details, these should not be construed as limitations on the scope of any inventions or of what may be claimed, but rather as descriptions of features specific to particular embodiments. Certain features described in this specification in the context of separate embodiments can also be implemented in combination in a single embodiment. Conversely, various features described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A treatment planning system comprising:
one or more processors; and
a non-transitory memory to store computer code instructions, the computer code instructions, when executed, cause the one or more processors to:
determine positions of a sequence of energy layers across a dimension of a planning target volume (PTV) along a proton field direction, such that for each pair of consecutive energy layers of the sequence of energy layers, a distance between each pair of consecutive energy layers is proportional to a width of a Bragg peak corresponding to an energy layer of each pair of consecutive energy layers; and
generate a proton therapy plan for irradiating the PTV according to the sequence of energy layers.

2. The treatment planning system of claim 1, wherein the distance between each pair of consecutive energy layers is proportional to a width of a Bragg peak corresponding to an energy layer of each pair of consecutive energy layers that is farther away from a source of a proton pencil beam.

3. The treatment planning system of claim 1, wherein the width of the Bragg peak corresponding to the energy layer of each pair of consecutive energy layers is equal to a full width at half maximum (FWHM) of the Bragg peak along the proton field direction.

4. The treatment planning system of claim 1, wherein each energy layer of the sequence of energy layers is associated with a corresponding Bragg peak, and the one or more processors are further configured to:
determine, for each energy layer of the sequence of energy layers, an intensity of a corresponding proton pencil beam to generate the corresponding Bragg peak.

5. The treatment planning system of claim 1, wherein to determine the positions of the sequence of energy layers across the dimension of the planning target volume (PTV) along the proton field direction, the one or more processors are configured to:
determine a first position of a first energy layer of the sequence of energy layers to overlap with a distal end of the PTV along the proton field direction;
determine a first width of a first Bragg peak corresponding to the first energy layer of the sequence of energy layers; and
determine a second position of a second energy layer of the sequence of energy layers to be at a distance from the first energy layer proportional to the first width of the first Bragg peak.

6. The treatment planning system of claim 5, wherein to determine the positions of the sequence of energy layers across the dimension of the planning target volume (PTV) along the proton field direction, the one or more processors are further configured to iteratively:
determine a width of a Bragg peak corresponding to a current energy layer of the sequence of energy layers; and
determine a position of a subsequent energy layer of the sequence of energy layers to be at a distance from the current energy layer proportional to the width of the Bragg peak corresponding to the current energy layer of the sequence of energy layers, the subsequent energy layer closer to a source of a proton pencil beam compared to the current energy layer of the sequence of energy layers.

7. The treatment planning system of claim 1, wherein the sequence of energy layers extends between two ends of the PTV along the proton field direction.

8. The treatment planning system of claim 1, wherein the one or more processors are further configured to:
determine, for each energy layer of the sequence of energy layers, (i) a cross-sectional area (boundary) of the PTV along each energy layer, and (ii) positions of a plurality of radiation dose spots in the cross-sectional area of the PTV along each energy layer, each pair of adjacent radiation dose spots are spaced by a distance smaller than or equal to a full width at half maximum (FWHM) of each pair of adjacent radiation dose spots, each radiation dose spot representing a radiation dose distribution within the cross-sectional area of the PTV along each energy layer of a corresponding proton pencil beam.

9. The treatment planning system of claim 8, wherein the one or more processors are further configured to:
determine, for each energy layer of the sequence of energy layers, (i) a number $N_s$ of radiation dose spots in the cross-sectional area of the PTV along each energy layer to be greater than or equal to $$N_s = \frac{4 \times A_l(PTV)}{\pi \times FWHM^2},$$

wherein $A_l(PTV)$ represents the cross-sectional area of the PTV along each energy layer.

10. The treatment planning system of claim 8, wherein the one or more processors are further configured to:
determine, for each radiation dose spot of the plurality of radiation dose spots in the cross-sectional area of the PTV along each energy layer, an orientation of the corresponding proton pencil beam based on a position of each radiation dose spot.

11. A method of proton therapy planning comprising:
determining, by one or more processors, positions of a sequence of energy layers across a dimension of a planning target volume (PTV) along a proton field direction, such that for each pair of consecutive energy layers of the sequence of energy layers, a distance between each pair of consecutive energy layers is proportional to a width of a Bragg peak corresponding to an energy layer of each pair of consecutive energy layers; and
generating, by the one or more processors, a proton therapy plan for irradiating the PTV according to the sequence of energy layers.

12. The method of claim 11, wherein the distance between each pair of consecutive energy layers is proportional to a width of a Bragg peak corresponding to an energy layer of each pair of consecutive energy layers that is farther away from a source of a proton pencil beam.

13. The method of claim 11, wherein each energy layer of the sequence of energy layers is associated with a corresponding Bragg peak, and the method further comprising:
determining, by the one or more processors, for each energy layer of the sequence of energy layers, an intensity of a corresponding proton pencil beam to generate the corresponding Bragg peak.

14. The method of claim 11, wherein determining the positions of the sequence of energy layers across the dimension of the planning target volume (PTV) along the proton field direction comprises:
determining, by the one or more processors, a first position of a first energy layer of the sequence of energy layers to overlap with a distal end of the PTV along the proton field direction;

determining, by the one or more processors, a first width of a first Bragg peak corresponding to the first energy layer of the sequence of energy layers; and determining, by the one or more processors, a second position of a second energy layer of the sequence of energy layers to be at a distance from the first energy layer proportional to the first width of the first Bragg peak.

15. The method of claim 14, wherein determining the positions of the sequence of energy layers across the dimension of the planning target volume (PTV) along the proton field direction further comprises iteratively:

determining, by the one or more processors, a width of a Bragg peak corresponding to a current energy layer of the sequence of energy layers; and determining, by the one or more processors, a position of a subsequent energy layer of the sequence of energy layers to be at a distance from the current energy layer proportional to the width of the Bragg peak corresponding to the current energy layer of the sequence of energy layers, the subsequent energy layer closer to a source of a proton pencil beam compared to the current energy layer of the sequence of energy layers.

16. The method of claim 11, wherein the sequence of energy layers extends between two ends of the PTV along the proton field direction.

17. The method of claim 11, further comprising:

determining, by one or more processors, for each energy layer, of the sequence of energy layers, (i) a cross-sectional area (boundary) of the PTV along each energy layer, and (ii) positions of a plurality of radiation dose spots in the cross-sectional area of the PTV along each energy layer, each pair of adjacent radiation dose spots are spaced by a distance smaller than or equal to a full width at half maximum (FWHM) of each pair of adjacent radiation dose spots, each radiation dose spot representing a radiation dose distribution within the cross-sectional area of the PTV along each energy layer of a corresponding proton pencil beam.

18. The method of claim 17, further comprising:

determining, by the one or more processors, for each energy layer of the sequence of energy layers, (i) a number $N_s$ of radiation dose spots in the cross-sectional area of the PTV along each energy layer to be greater than or equal to $$N_s = \frac{4 \times A_l(PTV)}{\pi \times FWHM^2},$$

wherein $A_l(PTV)$ represents the cross-sectional area of the PTV along each energy layer.

19. The method of claim 17, further comprising:

determining, by the one or more processors, for each radiation dose spot of the plurality of radiation dose spots in the cross-sectional area of the PTV along each energy layer, an orientation of the corresponding proton pencil beam based on a position of each radiation dose spot.

20. A non-transitory computer-readable medium including computer code instructions stored thereon, the computer code instructions, when executed, cause one or more processors to:

determine positions of a sequence of energy layers across a dimension of a planning target volume (PTV) along a proton field direction, such that for each pair of consecutive energy layers of the sequence of energy layers) a distance between each pair of consecutive energy layers is proportional to a width of a Bragg peak corresponding to an energy layer of each pair of consecutive energy layers; and generate a proton therapy plan for irradiating the PTV according to the sequence of energy layers.

* * * * *